(No Model.)
W. C. STICK.
FERTILIZER DISTRIBUTER.
No. 281,317. Patented July 17, 1883.
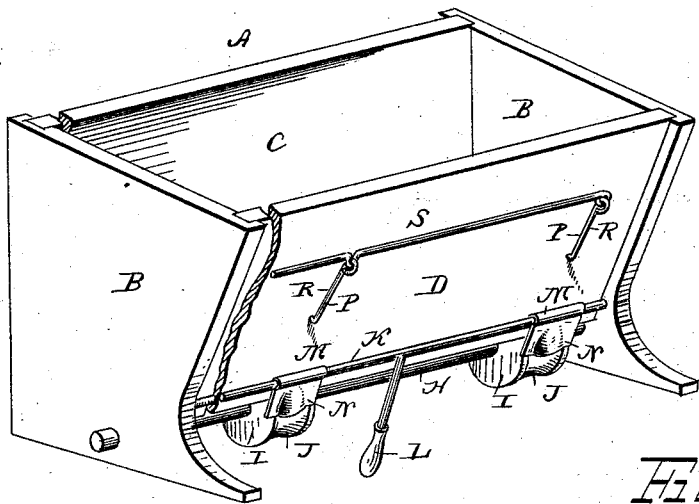
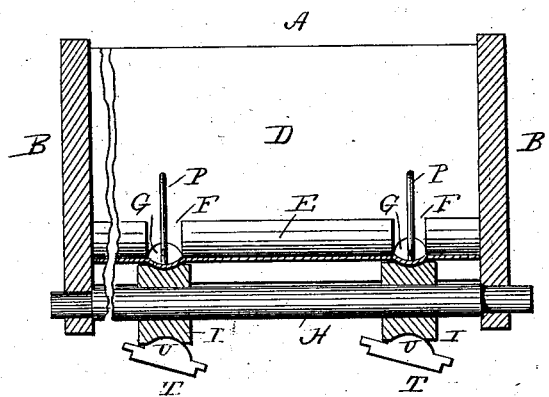 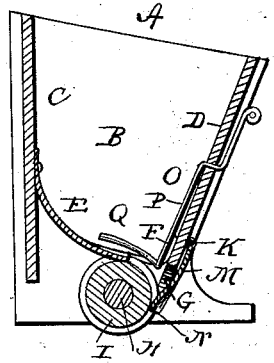
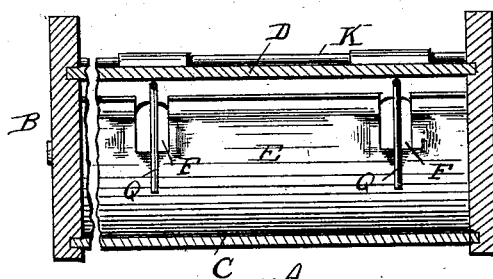 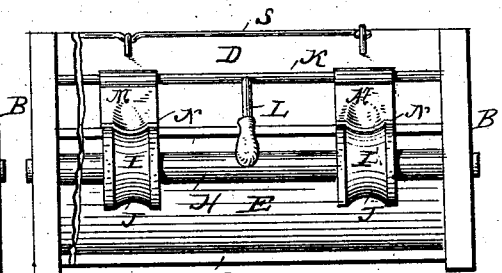
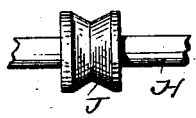
WITNESSES
F. L. Ourand
J. Reed Littell
W. C. Stick
INVENTOR
by A. Snow & Co.
ATTORNEYS.

UNITED STATES PATENT OFFICE.

WILLIAM CHESTER STICK, OF HANOVER, PENNSYLVANIA.

FERTILIZER-DISTRIBUTER.

SPECIFICATION forming part of Letters Patent No. 281,317, dated July 17, 1883.

Application filed February 26, 1883. (No model.)

*To all whom it may concern:*

Be it known that I, WILLIAM C. STICK, a citizen of the United States, residing at Hanover, in the county of York and State of Pennsylvania, have invented a new and useful Fertilizer-Distributer, of which the following is a specification, reference being had to the accompanying drawings.

This invention relates to fertilizer-distributers; and it consists in certain improvements in the construction and arrangement of parts, substantially as will be hereinafter more fully described, and particularly pointed out in the claim.

In the drawings, Figure 1 is a perspective view of a distributing-hopper constructed with my improvements. Fig. 2 is a vertical longitudinal sectional view of the same. Fig. 3 is a vertical transverse sectional view. Fig. 4 is a horizontal sectional view. Fig. 5 is a bottom view. Fig. 6 is a view of a modified form of distributing wheel or disk.

Referring to the drawings, A designates the hopper, which consists of the end pieces, B B, back piece, C, and front piece, D. The bottom of the hopper is formed by a forwardly inclined and preferably curved plate, E, having openings F near the front piece, D, which openings F register with openings G in the latter.

H designates a rotary shaft having bearings at the sides of the hopper, and carrying a series of distributing wheels or disks, I, that turn with the shaft, and are disposed so as to close the openings F in the bottom plate, E. The periphery or rim J of these wheels I is concaved around the circumference thereof, as shown; or it may be formed with a broad circumferential groove, such as the one shown in Fig. 6 of the drawings, which is V-shaped in cross-section.

In operation, the fertilizer feeds from the hopper onto the wheels or disks, and fills the concavity of the latter, so that as the disks are revolved the fertilizer is carried in the said concavity out through the opening in which the wheels are disposed.

To regulate the feed, a longitudinal rock-shaft, K, is journaled above the openings G, between the ends B B of the hopper. This shaft is provided with an operating rod or handle, L, and with laterally-projecting plates M, that conform at their outer ends, N, with the transverse contour of the periphery of the wheel I that the plate engages. By operating the rock-shaft, the depth of the concavity of the wheel is regulated, and the feed altered as desired.

The operation and advantages of my invention are obvious. The mechanism is very simple, inexpensive, and durable, while the operation of the distributer can be effected with superior convenience and facility.

O is an agitator, that consists of swinging arms P, working through the front piece, D, and having their inner ends, Q, conforming to the periphery of the concaved wheels, and arranged to swing in the said concavity to prevent clogging of the discharging-openings. These arms P have ends projecting outside the hopper, as at R, which are pivoted to a reciprocating shaft, S, by which the said arms are operated.

T T are cleaning-plates, that are arranged under the hopper in diagonal position, and have a curved extension, U, which enters the concavity of the wheel and keeps the concaved periphery always clean and free from accumulations of fertilizer.

I claim as my invention—

The combination, with the hopper having a forwardly-inclined bottom provided with openings near the front, which register with openings in the front of the hopper, of a longitudinal shaft carrying a series of wheels or disks arranged to close the openings in the bottom, and provided with circumferentially concaved or grooved peripheries, and a rock-shaft journaled over the openings in the front of the hopper, and carrying laterally-projecting plates arranged to regulate the depth of the concavity of the disks, and conforming in shape at their ends to the transverse shape of the said wheels or disks, as set forth.

In testimony that I claim the foregoing as my own I have hereto affixed my signature in presence of two witnesses.

WILLIAM CHESTER STICK.

Witnesses:
 DAVID HOKE,
 A. N. MICHAEL.